United States Patent [19]

Pohle et al.

[11] Patent Number: 4,476,161
[45] Date of Patent: Oct. 9, 1984

[54] METHOD OF PRODUCING A BURIED LONG PERIOD GRATING

[75] Inventors: Richard H. Pohle, Cupertino; Robert C. Ohlmann, Palo Alto, both of Calif.

[73] Assignee: The United States of America as represented by the Secretary of the Air Force, Washington, D.C.

[21] Appl. No.: 518,590

[22] Filed: Jul. 29, 1983

[51] Int. Cl.³ .............................................. G02B 5/18
[52] U.S. Cl. ................................... 427/162; 156/152; 350/162.17
[58] Field of Search ............... 156/152; 427/160, 163, 427/164

[56] References Cited

U.S. PATENT DOCUMENTS

| | | | |
|---|---|---|---|
| 3,334,956 | 8/1967 | Staunton | 350/162 |
| 3,530,010 | 9/1970 | Blakely | 148/1 |
| 3,542,453 | 11/1970 | Kantor | 350/162 |
| 3,688,109 | 8/1972 | Gamble | 250/51.5 |
| 3,698,795 | 10/1972 | Flint | 350/162 R |
| 4,114,978 | 9/1978 | Bostick et al. | 350/1.7 |
| 4,281,894 | 8/1981 | Guha | 350/162 R |

OTHER PUBLICATIONS

Chi, Changhwi et al., "Spectral Shaped Aperture Component," *SPIE vol.* 240 *Periodic Structures, Gratings, Movie Patterns and Diffraction Phenomena,* 1980, pp. 185–200.

Chi, C. H. et al., "Buried Long Period Grating for Laser Applications," *SPIE vol.* 240 *Periodic Structures, Gratings, Movie Patterns and Diffraction Phenomena,* 1980, pp. 211–222.

*Primary Examiner*—John H. Newsome
*Attorney, Agent, or Firm*—Donald J. Singer; Jacob N. Erlich

[57] ABSTRACT

A method of producing a buried long period grating which is substantially unaffected by material stability, high tolerance requirements, stringent machining requirements, and heat transfer. The method takes a plurality of rectangular-shaped pieces of dielectric material and by a series of appropriate cuts, coatings and attachments produces an effective buried long period grating.

9 Claims, 8 Drawing Figures

METHOD OF PRODUCING A BURIED LONG PERIOD GRATING

STATEMENT OF GOVERNMENT INTEREST

The invention described herein may be manufactured and used by or for the Government for governmental purposes without the payment of any royalty thereon.

BACKGROUND OF THE INVENTION

This invention relates generally to buried long period gratings, and, more particularly, to an improved method of manufacturing such buried long period gratings.

As lasers have been improved through the years, their use has been extended into a great number of new areas. By expanding the use of lasers into various complex optical systems such as tracking, communications, etc, the optical components used with these lasers require improvement. For example, one such optical component which has great applicability in newly developed laser systems is a component capable of transmitting as well as reflecting light. Such a component is more commonly referred to as a beam splitter.

Unfortunately, the conventional beam splitter is generally unacceptable in high energy laser systems since it suffers from mechanical failure due to absorption or laser radiation which converts to heat. Recently, the blazed or buried long period grating (BLPG) has been developed as an optical component which overcomes problems generally associated with beam splitters. The BLPG is an optical component which provides reflection of high energy laser radiation, refraction of various other optical wavelengths, and removal of absorbed energy by coolant flow. Examples of typical buried long period gratings can be found in the following articles; Chi, Changhwi, "Spectral Shaped Aperture Component," SPIE, Vol. 240, 1980, pgs 185–200 and Chi, C. H. et al, "Buried long period grating for laser applications," SPIE, vol 240, 1980, pgs. 211–222.

The buried long period grating provides a period so large that the grating facet becomes a mirror for the wavelength of interest, thereby minimizing diffraction effects. In general, the long period grating is placed on a cooled metal substrate (for example, molybdenum), buried within a transparent, thermally conductive material, and overcoated with a multilayer dichroic coating that reflects the high energy laser beam and transmits beams of other wavelengths. Since the grating facet of the BLPG is a mirror, the buried long period grating exhibits a large number of desirable characteristics such as: high efficiency, insensitivity to polarization and wavelength, operability over a wide spectral range, minimization of spectral dispersion, and ease of alignment.

Although there are a number of ways to fabricate the blazed or buried long period grating, each method heretofore in use introduces problems associated with material stability, machining tolerances and heat transfer. These problems have substantially affected the acceptability of the blazed or buried long period grating. As a result, it is readily apparent that there exists a great need to improve the fabrication techniques heretofore utilized in the manufacture of the buried long period grating.

SUMMARY OF THE INVENTION

The present invention provides a method of manufacturing buried long period gratings (BLPG) which overcomes substantially all the problems associated with fabrication techniques utilized in the past and as set forth hereinabove.

The method of this invention requires a plurality of optically polished plates of dielectric material such as ZnSe or ZnS preferably approximately 1 cm in thickness. These plates are clamped together in any suitable fashion in a staggered relationship. Once held in that position, the top and bottom surfaces are cut at a preselected angle with respect to the horizontal. These top and bottom surfaces are now polished so as to form flat and parallel surfaces.

Thereafter, the plates are separated and cleaned. Once again the plates are clamped together in a staggered fashion. In this case, however, an optical contacting or transparent glue is used between the interfacing surfaces of the plates so as to securely fix the plates in position with respect to one another. The resultant design created by the plurality of juxtaposed plates provides a pair of saw-tooth faces.

The next step includes coating one of the saw-toothed faces with any suitable wide band reflective coating for wavelengths other than the high energy laser. The plates are then cut along the line between the saw-tooth faces. Once cut, the plates are repositioned and bonded together in thermal contact such that the wide band reflective coating of one of the saw-tooth faces is positioned adjacent to the other of the saw-tooth faces. Any suitable type of bonding agent may be utilized to securely fix the plates in this position.

Thereafter, the plates are once again cut, this time adjacent to the bond between the two plates, and the cut surface is polished. This polished surface, including the wide band reflective coated saw-tooth face, is bonded in thermal contact along the polished surface to any suitable cooled flat mirror made of, for example, molybdenum. This cooled flat mirror constitutes a cooled substrate for the buried long period grating of the present invention. Next, the remaining portion of the plates is cut along a line adjacent the wide band reflective coated saw-tooth configured section, and this cut portion is polished and overcoated with a high reflectivity, high energy laser coating.

By providing a buried long period grating with the method steps of the present invention in which the buried grating is suspended in a transparent thermally conductive substrate such as zinc selenide, there is little thermal stress at the saw-tooth peaks. Furthermore, with this invention, the buried grating is optically polished and not diamond turned.

It is therefore an object of this invention to provide a method of fabricating a buried long period grating.

It is another object of this invention to provide a method of fabricating a buried long period grating which eliminates problems associated with material stability, machining tolerances and heat transfer.

It is still another object of this invention to provide an economical method of fabricating a buried long period grating.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 6:
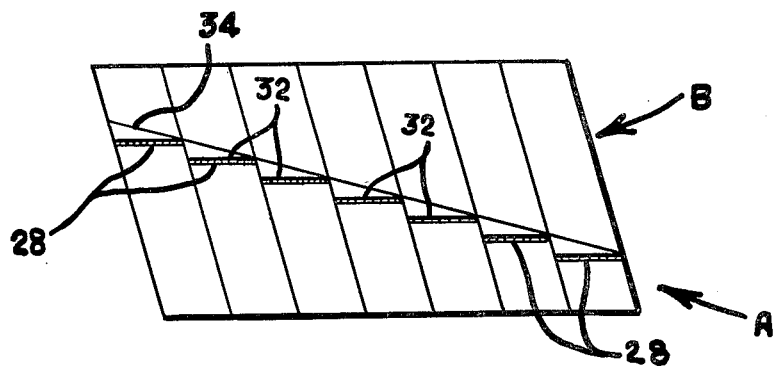
Figure 7:
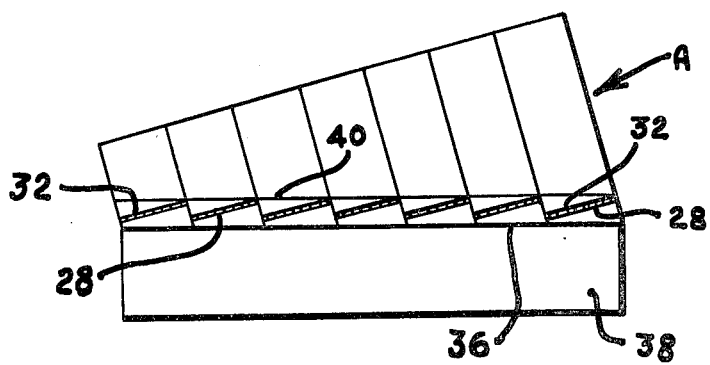
Figure 8:
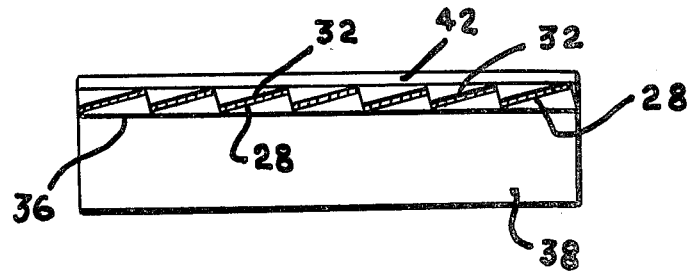

FIG. 6 schematically illustrates the repositioning of one portion of the plurality of plates adjacent the other of the saw-tooth faces and cutting the plates into two portions during the method of this invention;

FIG. 7 illustrates schematically the positioning and adhering of one of the portions of the plates upon a cooled substrate after and an additional appropriate cutting of the plates during the fabrication of this invention; and FIG. 8 is a schematic representation of the finished buried long period grating made by the method of this invention.

DETAILED DESCRIPTION OF THE PREFERRED METHOD

Reference is now made to the various Figures of the drawing which illustrate schematically the plurality of steps involved with the present invention during the fabrication of a buried long period grating (BLPG).

Figure 1:
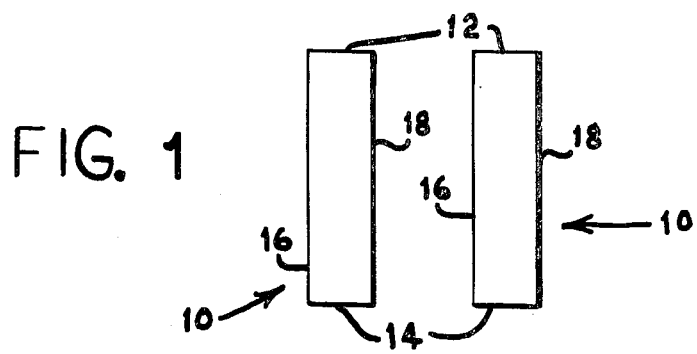
FIG. 1 is a schematic representation of the plates utilized in the process of this invention of fabricating a buried long period grating.

As shown in FIG. 1 of the drawing, it is first necessary to provide a plurality of plates made from a transparent, thermally conductive material such as ZnSe or ZnS. Generally, seven such plates are required for a 7 cm aperture grating, however, for simplicity only two of such plates 10 are illustrated in FIG. 1 of the drawing. Each of the plates 10 are preferably of a rectangular configuration having a top portion 12 and a bottom portion 14 as well as a pair of parallel opposed front and back surfaces 16 and 18, respectively. In general, these plates are approximately 1 cm thick. In addition, it is necessary to optically polish the front and back surfaces 16 and 18, respectively, of each of the plates 10.

Figure 2:
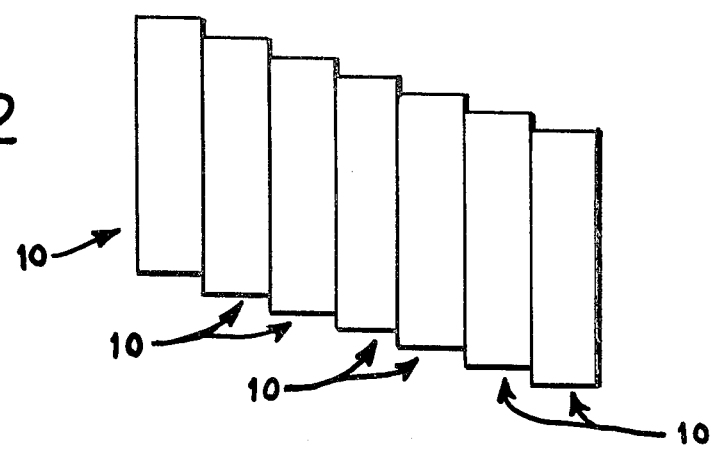
FIG. 2 is a schematic illustration of a plurality of such plates placed together in a staggered relationship during the fabrication process of this invention.

Reference is now made to FIG. 2 of the drawing in which seven such plates 10 are shown. These plates 10 are clamped together by any suitable clamping means (not shown) and are temporarily held in a juxtaposed staggered relationship by any wax or other suitable interface between adjacent front and back surfaces of plates 10.

Figure 3:
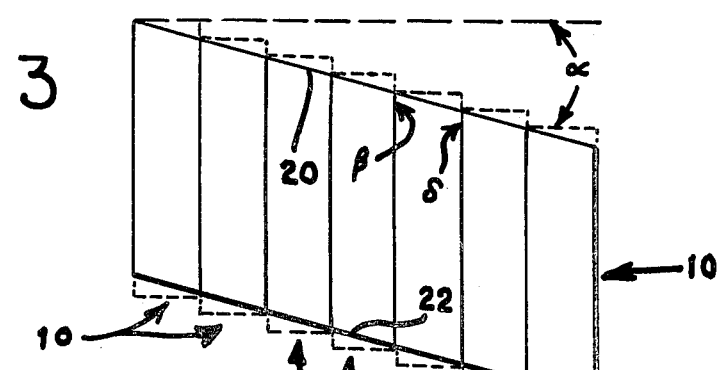
FIG. 3 is a schematic representation of the plates during the process of this invention in which a pair of cuts are made within the plates.

Once in the position illustrated in FIG. 2 of the drawing, it is necessary to now cut away the top and bottom portions of the plates 10 as illustrated in FIG. 3 along a parallel pair of lines 20 and 22, these lines 20 and 22 being positioned at a preselected angle $\alpha$ with respect to the horizontal. By an appropriate selection of angle $\alpha$, this angle $\alpha$ will determine the angles $\beta$ and $\gamma$ for each of the plates 10 wherein $\beta = 90° - \alpha$ and $\gamma = 90° + \alpha$. Once the plates are cut along lines 20 and 22, the surfaces related to these cuts are polished parallel to each other.

Figure 4:
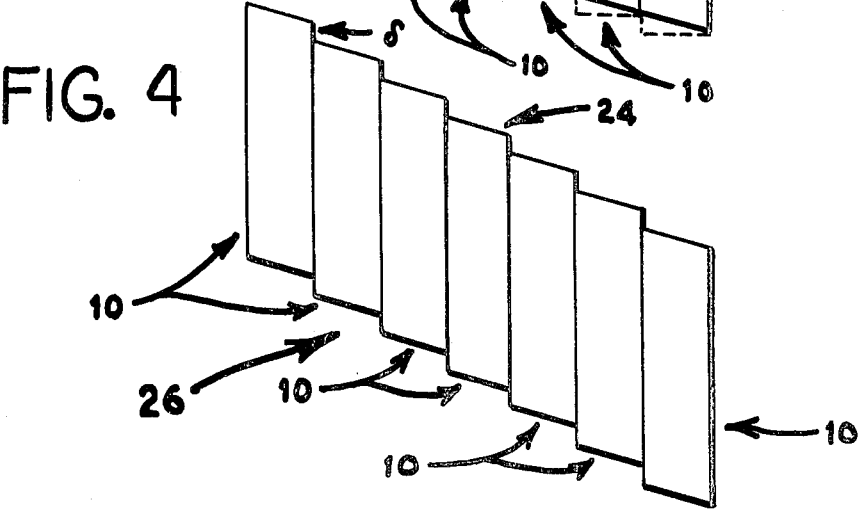
FIG. 4 is a schematic representation of the plates rearranged in another staggered relationship after the cuts of FIG. 3 have taken place in order to produce a pair of saw-tooth faces.

Thereafter, plates 10 are separated from one another and thoroughly cleaned of any of the wax or other substance thereon. The separated plates 10 are once again positioned adjacent one another in a staggered fashion as shown in FIG. 4 with an overlap distance between each of adjacent plates 10 of $\delta$. In this position, plates 10 are secured together by any optical contacting or transparent glue and once again clamped together, this time to securely fix plates 10 in position with respect to one another. In this manner, a pair of saw-tooth faces 24 and 26 are established on opposite sides of the staggered plates.

Figure 5:
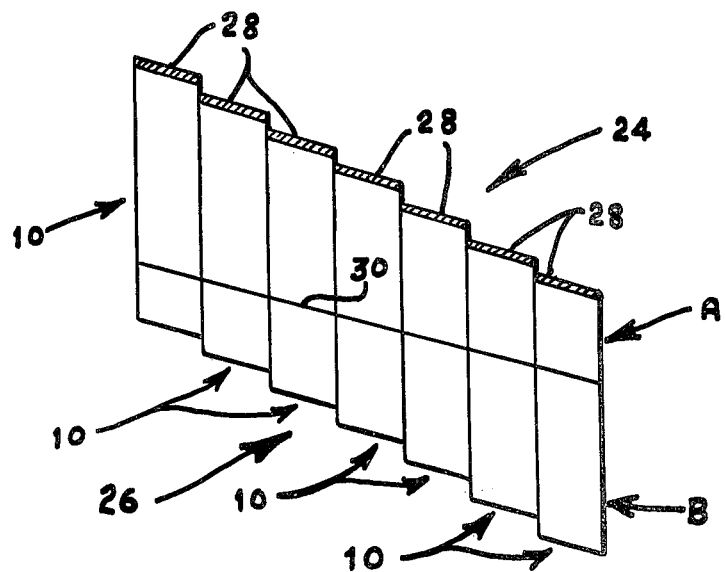
FIG. 5 is a schematic representation of the staggered plates during another step of the fabrication process of this invention showing another cut being made after a high reflective coating has been placed on one of the saw-tooth faces.

As illustrated in FIG. 5 of the drawing, one of the saw-tooth faces, 24, is coated with any suitable wide band reflective coating 28 such as a thin coating of aluminum or silver. Thereafter the plurality of plates 10 are cut along a line 30 between the saw-tooth faces 24 and 26. By cutting the plates 10 along line 30, two separate sections A and B are established.

As shown in FIG. 6 of the drawing, section A of the plurality of plates 10 is now repositioned and secured with its saw-tooth face 24 situated against the saw-tooth face 26 of section B. In this position, any suitable thermally conductive bonding agent 32 can be utilized to securely fix the plates together. By so doing the wide band reflective coating 28 is now imbedded within the dielectric material of plates 10. Still referring to FIG. 6 of the drawing, the repositioned plates are now cut along a plane 34 equidistant from the saw-tooth face and subsequently polished to a plane on the exposed surface, and the remaining portion of section B can be removed.

Once so cut, section A and the bonded portion of B are now inverted and secured by any suitable thermally conducting bonding agent 36 to a cooled substrate 38 such as a flat mirror made of Mo or Si. Thereafter, the section A is once again cut and polished, this time along line 40 parallel to the substrate, the remaining portion of section A may then be disposed of.

The resultant structure as shown in FIG. 8 of the drawing now receives a high energy laser (HEL) coating 42 such as a highly reflective dielectric coating which reflects at the HEL wavelength band (for example, the 2.7 to 2.9 or 3.7 to 3.9 micron band) and transmits all tracking bands upon the surface exposed when the remaining portion of section B is removed, thereby completing the fabrication process of the buried long period grating of the present invention. By producing a BLPG with the technique of this invention problems associated with prior fabrication techniques, such as material stability, high tolerance stringent machining requirements, and heat transfer can be substantially eliminated.

Although this invention has been described with reference to a particular method, it will be understood that this method is also capable of further or other steps within the spirit and scope of the appended claims.

We claim:

1. A method of fabricating a buried long period grating comprising the steps of:
    (a) providing a plurality of rectangular-shaped plates, each of said plates being made of a dielectric material and having oppositely disposed front and back surfaces and oppositely disposed top and bottom surfaces;
    (b) optically polishing said front and back surfaces of each of said plates;

(c) clamping said plurality of plates together in a staggered relationship with said polished front and back surfaces of adjacent plates being in contact with each other;
(d) cutting said top and bottom surfaces of said plates along a first and second line, and forming first and second flat surfaces on opposite sides of each of said plates;
(e) polishing said first and second surfaces;
(f) separating said plates;
(g) securing said plurality of plates back together in a staggered relationship with said polished front and back surfaces of adjacent plates being in contact with each other, thereby forming a pair of saw-tooth faces;
(h) coating one of said saw-tooth faces with a reflective coating;
(i) cutting said plurality of plates into a first and a second section along a line parallel to said one saw-tooth face;
(j) bonding said one reflective coated, saw-tooth face of said first section to the other of said saw-tooth faces of said second section;
(k) cutting said bonded first and second sections along a line located in said second section adjacent said reflective coated, saw-tooth face of said first section in order to form a flat surface;
(l) polishing said flat surface;
(m) bonding said flat polished surface of said first section to a substrate;
(n) cutting said plurality of plates along a line located in said first section to form another flat surface;
(o) polishing said other flat surface; and
(p) coating said other flat surface with a highly reflective material.

2. A method of fabricating a buried long period grating as defined in claim 1 wherein said first and said second lines being cut in said top and bottom surfaces of said plates are cut parallel to each other.

3. A method of fabricating a buried long period grating as defined in claim 2 further comprising the step of cleaning said plates after said plates are separated.

4. A method of fabricating a buried long period grating as defined in claim 1 wherein said first and said second flat surfaces of each of said plates are disposed a preselected distance from said first and said second flat surfaces of adjacent plates after said plurality of plates are secured back together in a staggered relationship.

5. A method of fabricating a buried long period grating as defined in claim 4 wherein said first and said second lines being cut in said top and bottom surfaces of said plates are cut parallel to each other.

6. A method of fabricating a buried long period grating as defined in claim 5 further comprising the step of cleaning said plates after said plates are separated.

7. A method of fabricating a buried long period grating as defined in claim 6 wherein said reflective coating is a wide band reflective coating.

8. A method of fabricating a buried long period grating as defined in claim 7 wherein said highly reflective material reflects at the 2.7 to 2.9 micron band and transmits all tracking bands.

9. A method of fabricating a buried long period grating as defined in claim 7 wherein said highly reflective material reflects at the 3.7 to 3.9 micron band and transmits all tracking bands.

* * * * *